US 6,681,276 B1

(12) United States Patent
Jeong et al.

(10) Patent No.: US 6,681,276 B1
(45) Date of Patent: Jan. 20, 2004

(54) PLAYER HAVING CASSETTE PLAYING UNIT AND MEMORY CARD PLAYING UNIT

(75) Inventors: Hwoa Su Jeong, Pyungtaek (KR); Jin Woo Seo, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/549,563

(22) Filed: Apr. 14, 2000

(30) Foreign Application Priority Data

Apr. 15, 1999 (KR) .......................................... 1999/13392

(51) Int. Cl.[7] .......................... G06F 3/00; G06F 13/12; G06F 13/38
(52) U.S. Cl. ............................ 710/72; 710/62; 710/73; 710/100; 375/219; 704/500; 711/103; 711/115; 360/134; 365/97
(58) Field of Search ...................... 710/62, 72; 700/94; 704/500, 270; 711/115, 103; 709/210, 217; 707/526; 714/36

(56) References Cited

U.S. PATENT DOCUMENTS

| 5,963,872 A | * 10/1999 | Stein .......................... 455/557 |
| 5,986,200 A | * 11/1999 | Curtin ..................... 434/307 A |
| 6,243,686 B1 | * 6/2001 | McPherson et al. ........ 704/270 |
| 6,327,633 B1 | * 12/2001 | Chawla et al. .............. 235/486 |

* cited by examiner

*Primary Examiner*—Kim Huynh
*Assistant Examiner*—Angel Casiano
(74) *Attorney, Agent, or Firm*—Birch, Stewart, Kolasch & Birch, LLP

(57) ABSTRACT

A memory card player, designed to reproduce a variety of digital audio data files from a memory card, is disclosed. Such data files are downloaded by a computer through the Internet or through a PC communication network and are transferred from the computer to the memory card. In an embodiment, the memory card player is integrated with a conventional cassette player, thus selectively playing a cassette tape or a memory card. This player is thus thin, and so it is convenient to a user while carrying it. The memory card player installs one or more memory cards at the same time, thus having a large memory capacity. In the player, a deck body, having a cassette playing unit, is provided with an openable door. A memory card holder is set on the interior surface of the door and holds a memory card. Each of the holders has a plurality of contact terminals for coming into contact with the memory card. A card insert opening is formed on the player body at a position corresponding to each of the holders and is used for installing a memory card in the holder. A card locking member is formed on the deck body at a position corresponding to the card insert opening, thus providing a simple configuration to prevent a memory card from being unexpectedly removed from the insert opening when the door is closed.

12 Claims, 8 Drawing Sheets

PLAYER HAVING CASSETTE PLAYING UNIT AND MEMORY CARD PLAYING UNIT

BACKGROUND OF THE INVENTION

1. Field of the Invention

The present invention relates, in general, to digital audio data players and, more particularly, to a memory card player designed to reproduce a variety of digital audio data files from a memory card, the data files being downloaded by a computer through the Internet or through a PC communication network and being transferred from the computer to the memory card.

2. Description of the Prior Art

Figure 1:
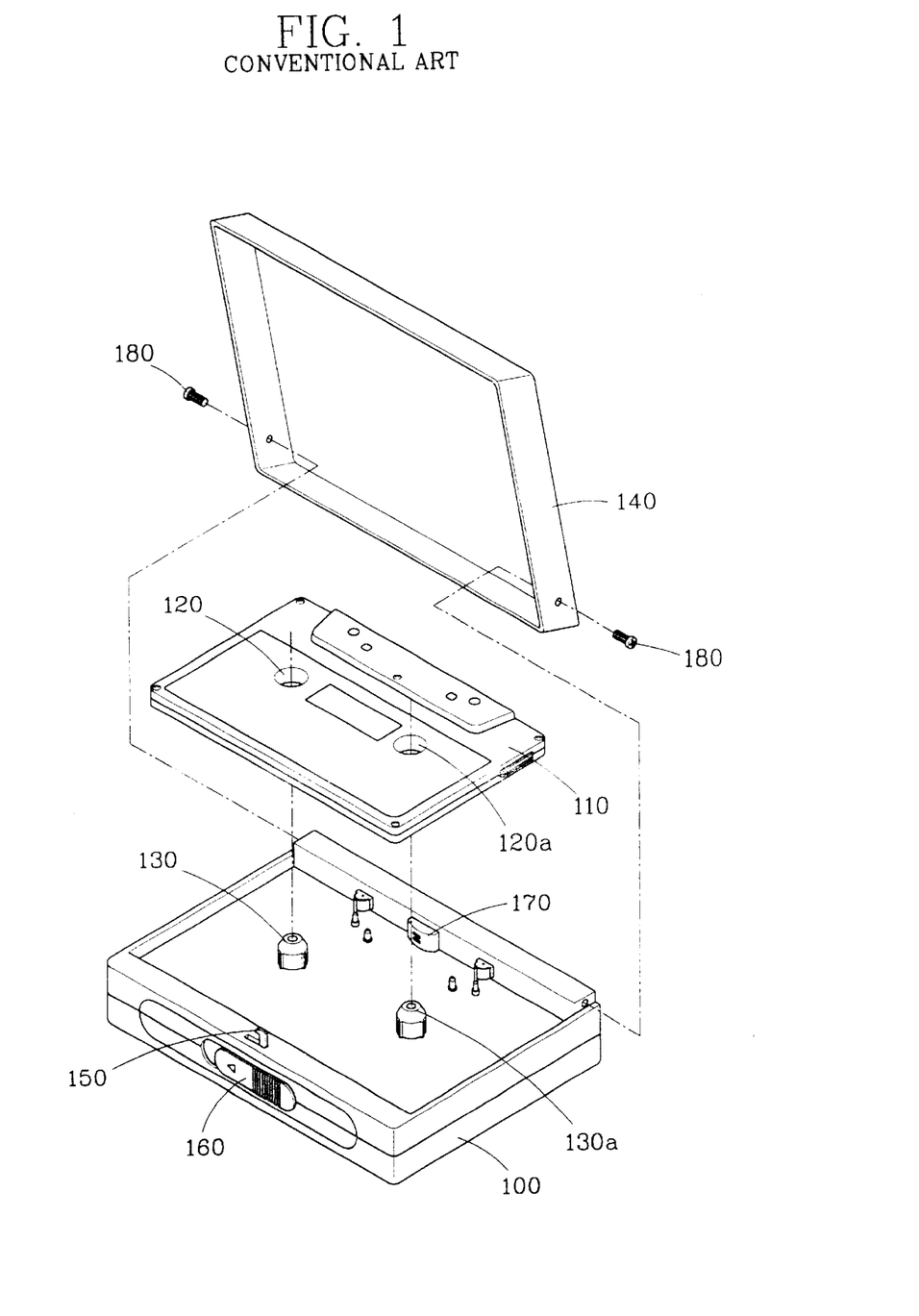
FIG. 1 is an exploded perspective view of a conventional personal cassette player.
Figure 2:
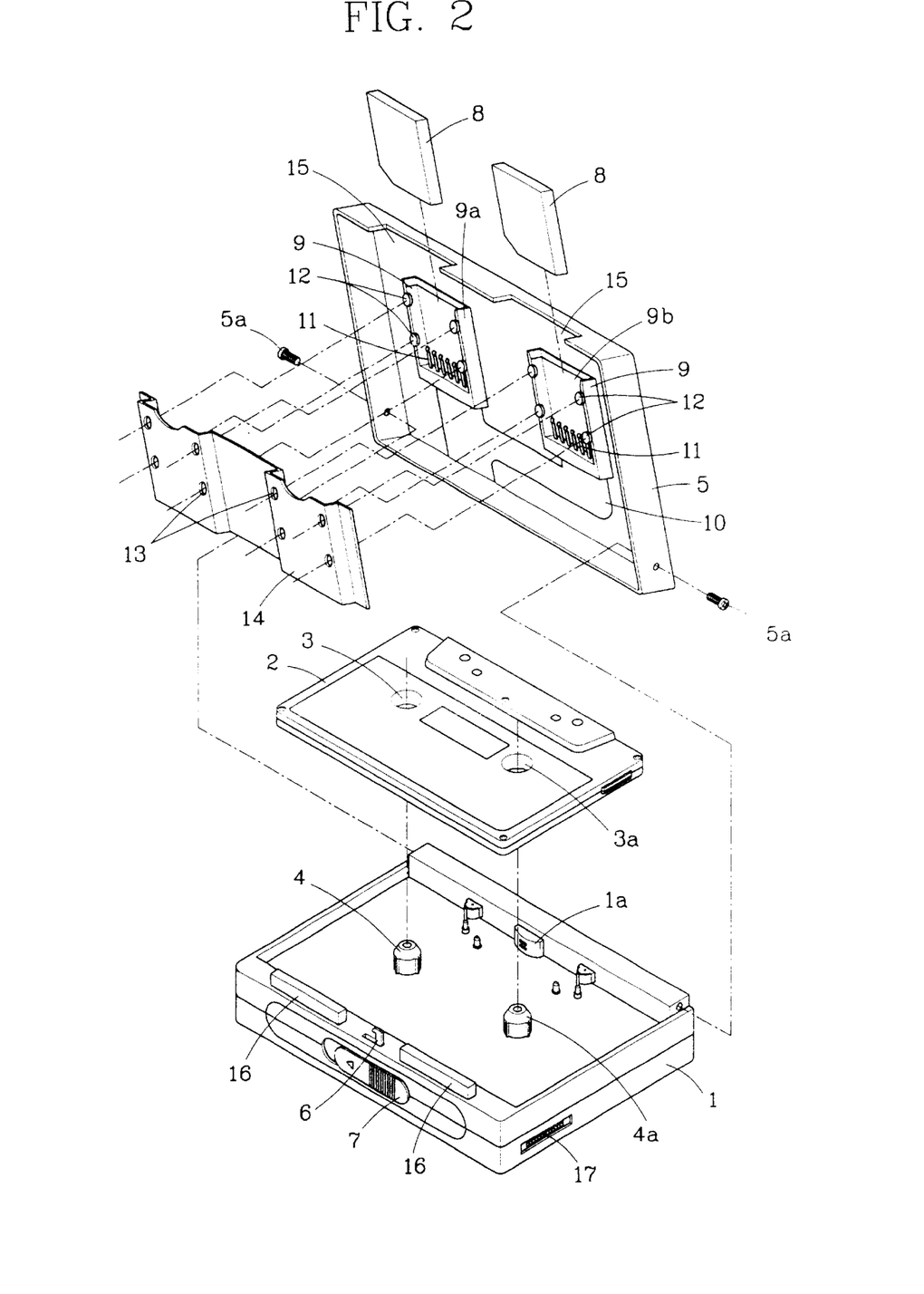
FIG. 2 is an exploded perspective view of a memory card player, which is designed to selectively play a cassette tape or a memory card in accordance with the primary embodiment of the present invention.
Figure 3:
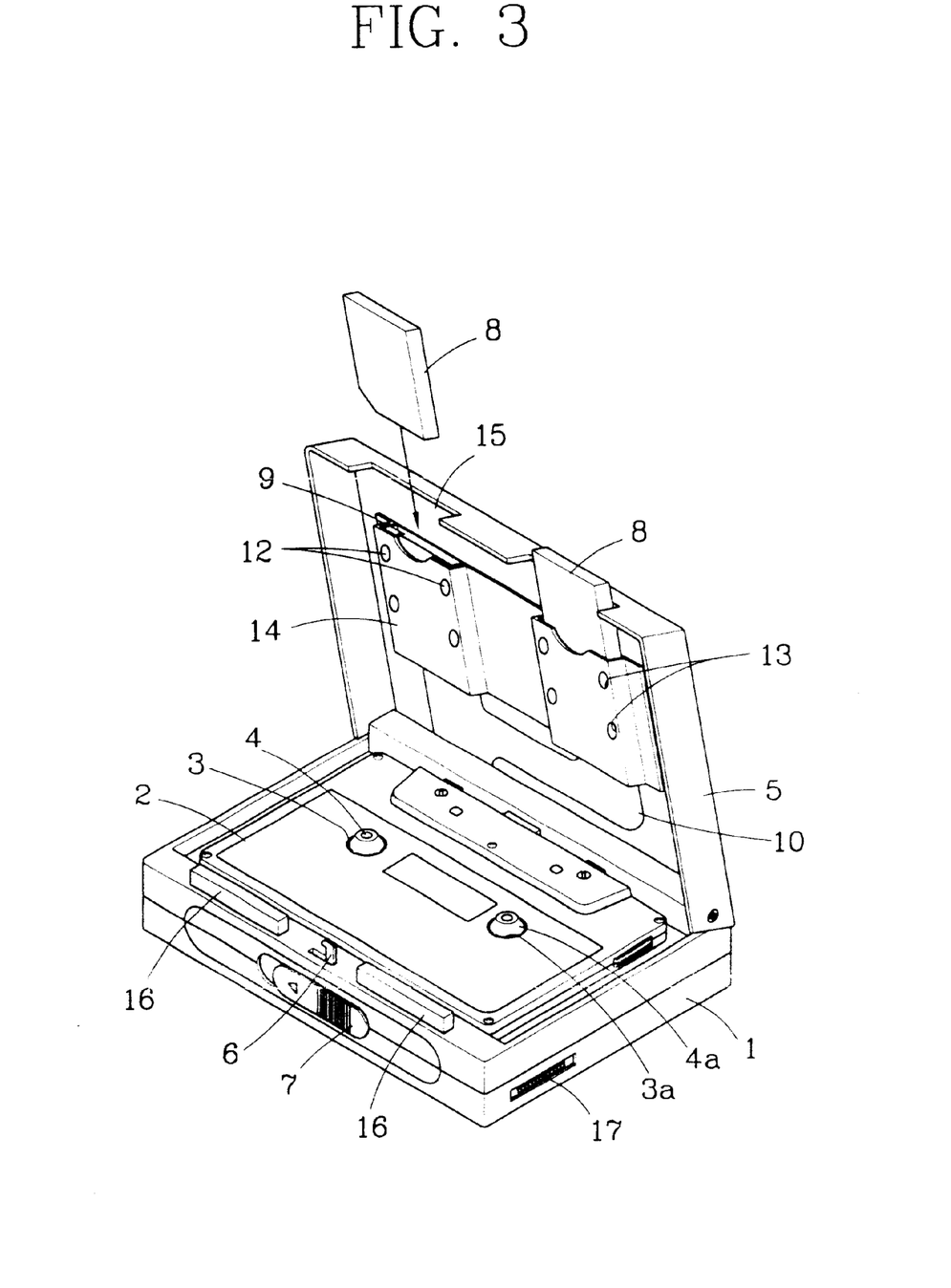
FIG. 3 is a perspective view of the memory card player of FIG. 2, with the door of the player being opened and one of two memory cards being installed in its holder provided on the door and the other card being shown at a removed position.

FIG. 1 is an exploded perspective view of a conventional personal cassette player. As shown in the drawing, two reels, or one supply reel 130 and one take-up reel 130A, are provided on the bottom of a deck body 100 at predetermined positions corresponding to that of two reel holes 120 and 120A of a conventional cassette 110. An openable door 140 is hinged to the back wall of the deck body 100.

A locking lever 150 is provided on the front wall of the deck body 100 at the center of the top surface for locking or releasing the door 140. The above locking lever 150 is operated by a thumb-operable open switch 160 provided at the external surface of the front wall.

In the drawing, the reference numeral 170 denotes a head, and 180 denotes a set screw used for movably locking the door 140 to the deck body 100.

However, such a conventional cassette player is designed to only reproduce or record audio signals from or on a cassette tape.

Therefore, the conventional cassette player does not have any means for reproducing digital audio data files from a memory card, the data files being downloaded by a computer through the Internet or through a PC communication network and being transferred from the computer to the memory card. The conventional cassette player thus fails to meet the recent requirement of people wanting to collaterally use the cassette player for playing a memory card. If a cassette player were able to also play a memory card, the market competitiveness of the cassette player would be expected to improve remarkably.

SUMMARY OF THE INVENTION

Accordingly, the present invention has been made keeping in mind the above problems occurring in the prior art, and an object of the present invention is to provide a memory card player, which is designed to reproduce a variety of digital audio data files from a memory card, the data files being downloaded by a computer through the Internet or through a PC communication network and being transferred from the computer to the memory card.

Another object of the present invention is to provide a memory card player, which is designed to selectively play a cassette tape or a memory card, and which thus reproduces a variety of digital audio data files from the memory card, with the data files being downloaded by a computer through the Internet or through a PC communication network and being transferred from the computer to the memory card.

A further object of the present invention is to provide a memory card player, which is thin and is convenient to a user who carries the player.

Still another object of the present invention is to provide a memory card player, which is designed to install a plurality of memory cards at the same time, thus having a large memory capacity.

In order to accomplish the above object, an embodiment of the present invention provides a memory card player, comprising: a deck body provided with a cassette playing unit; and a memory card holder provided in the deck body and used for holding a memory card in the deck body.

Another embodiment of this invention provides a memory card player, comprising: a deck body provided with a cassette playing unit; an openable door hinged to the deck body; and at least one memory card holder provided in the door and individually used for holding a memory card in the door, each of the holders having a contact terminal for coming into contact with the memory card.

A further embodiment provides a memory card player, comprising: a player body; at least one memory card holder provided in the player body and individually used for holding a memory card in the player body, each of the holders having a contact terminal for coming into contact with the memory card; and a card insert opening formed on the player body at a position corresponding to each of the holders and used for installing a memory card in the holder.

Still another embodiment provides a memory card player, comprising: a player body having a contact port; a memory card holder used for holding a memory card, the holder having a contact terminal for coming into contact with a memory card; and a signal transmitting member connecting the memory card holder to the contact port of the player body.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In recent days, digital audio data players, designed to reproduce a variety of digital audio data files from a memory card, have been proposed and used. Such digital audio data files, such as MP3, PA, WAVE and MIDI, are downloaded by a computer through the Internet or through a PC communication network and are transferred from the computer to a memory card. In the present invention, the digital audio data player plays such a memory card to reproduce the digital audio data files, and so the player is referred to as a memory card player in the following description.

In a detailed description, when a user wants to listen to music in the form of a digital audio data file using such a player, the digital audio data file is downloaded by a computer through the Internet or through a PC communication network, thus being primarily stored in a hard disk of the computer. The digital audio data file is, thereafter, transferred from the hard disk to the memory card player through, for example, a printer cable.

In the player, the digital audio data file is stored in a removable memory card. When necessary, the player reads the digital audio data file from the memory card prior to reproducing the digital audio data file using a decoder. Therefore, it is possible for the user to listen to music in the form of such a digital audio data file using the player at a desired place.

The primary embodiment of the present invention provides a memory card player, which is designed to selectively play a cassette tape or a memory card. That is, in the memory card player of the primary embodiment, a memory card playing unit is set in a conventionally designed cassette player.

FIGS. 2 to 5 are views of the memory card player according to the primary embodiment. As shown in the drawings, the memory card player comprises a deck body 1 provided with a cassette playing unit. In the cassette playing unit, two reels, or one supply reel 4 and one take-up reel 4A, are provided on the bottom of the deck body 1 at predetermined positions corresponding to that of two reel holes 3 and 3A of a conventional cassette 2. An openable door 5 is hinged to the back wall of the deck body 1.

A locking lever 6 is provided on the front wall of the deck body 1 at the center of the top surface for locking or releasing the door 5. The above locking lever 6 is operated by a thumb-operable open switch 7 provided at the external surface of the front wall.

In the drawing, the reference numeral 1A denotes a head, and 5a denotes a set screw used for movably locking the door 5 to the deck body 1.

In the preferred embodiments, at least one memory card holder is provided on the door of the player for individually holding a memory card in the player.

In the primary embodiment, two memory card holders 9 are formed adjacent to the cassette, preferably between the cassette 2 and the door 5, e.g., on the interior surface of the door 5 in a way such that the two holders 9 are spaced apart from each other at an interval.

A plurality of contact terminals 11 are provided on the lower portion of each holder 9 for transmitting data from a memory card 8 to the deck body 1 through a flexible cable PCB 10. Of course, the contact terminals 11 receive data from the deck body 1 to the card 8 through the cable PCB 10.

In each of the above holders 9, both sidewalls 9A are projected from the interior surface of the door 5 toward the deck body 1 by a height, with the central portion of each holder 9 being recessed.

Each sidewall 9A of the holder 9 has a plurality of locking pieces 12 along its end surface. The above locking pieces 12 are spaced apart from each other at regular intervals.

The two holders 9 are commonly covered with a single cover 14. A plurality of locking holes 13 are formed on the cover 14 at positions corresponding to the locking pieces 12 of the two holders 9. The locking pieces 12 of the holders 9 are tightly fitted into the locking holes 13 of the cover 14, thus stably assembling the cover 14 with the holders 9 while defining a memory card seat 9B in each holder 9. The above cover 14 also fixes the flexible cable PCB 10 on the door 5. The cover 14 is specifically bent at several positions so as to meet the profile of the two holders 9, thus being brought into substantial contact with both the holders 9 and the land formed by the interior surface of the door 5.

A card insert opening 15 is formed on the door 5 at a position corresponding to the memory card seat 9B of each holder 9. The openings 15 are used for installing the memory cards 8 in the memory card holders 9.

Two card locking members 16 are provided on the deck body 1 at positions corresponding to the insert openings 15. The above locking members 16 prevent the memory cards 8 from being unexpectedly moved in the holders 9 or from being unexpectedly removed from the insert openings 15 with the door 5 being completely closed after the memory cards 8 are installed in the holders 9. The card locking members 16 are directed toward the insert openings 15.

Provided at the external surface of a sidewall of the deck body 1 is a contact port 17 through which the deck body 1 is connected to a signal transmitting member as will be described later herein.

The most important advantage of the primary embodiment resides in that the desired memory card player is formed by setting a memory card playing unit in a conventionally designed cassette player without increasing the thickness of the player.

That is, in the memory card player according to the primary embodiment, the memory card holders 9 are positioned between the interior surface of the door 5 and a sidewall 2D of a cassette 2 installed in the deck body 1. Therefore, it is possible to set the memory card playing unit of this invention in a conventionally designed cassette player without increasing the thickness of the player.

Figure 6:
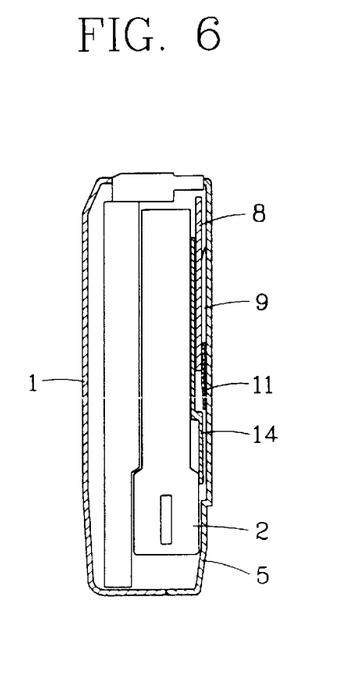
FIG. 6 is a cross-section of FIG. 4 taken along the view line VI–VI'.
Figure 7:
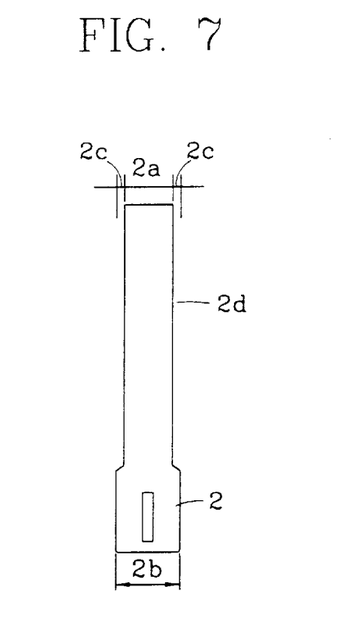
FIG. 7 is a side view of a cassette usable in the player of FIG. 2.

As shown in FIGS. 6 and 7, the thickness of a conventional cassette 2 is, e.g., 8.6 mm at the reel section 2A and is 12 mm at the head seated section 2B, and so the reel section 2A is thinner than the head seated section 2B by, e.g., 1.7 mm at each side 2C. Therefore, the interior of a conventional cassette player has a surplus space of, e.g., 1.7 mm at a position corresponding to the side 2C of the reel section 2A.

In the primary embodiment, the two memory card holders 9 are set on the door 5 in a way such that the holders 9 are positioned within the above-mentioned surplus space without causing any interference with a cassette 2 or the door 5 when the cassette 2 is installed within the player with the door 5 being completely closed. Therefore, the memory card playing unit of this invention is set in a conventionally designed cassette player without increasing the thickness of the player.

It is noted that FIGS. 2–6 depict an arrangement of the memory card playing units (including the memory card holders 9, etc., the inset opening 15 and the card locking members 16) as being oriented toward the open switch 7. Alternatively, one or both arrangements could be rotated ±90° to be oriented toward one or both ends of the body 1. Also, one memory card playing unit could be provided, or three or possibly more.

The above memory card player of the primary embodiment will be operated as follows.

Figure 4:
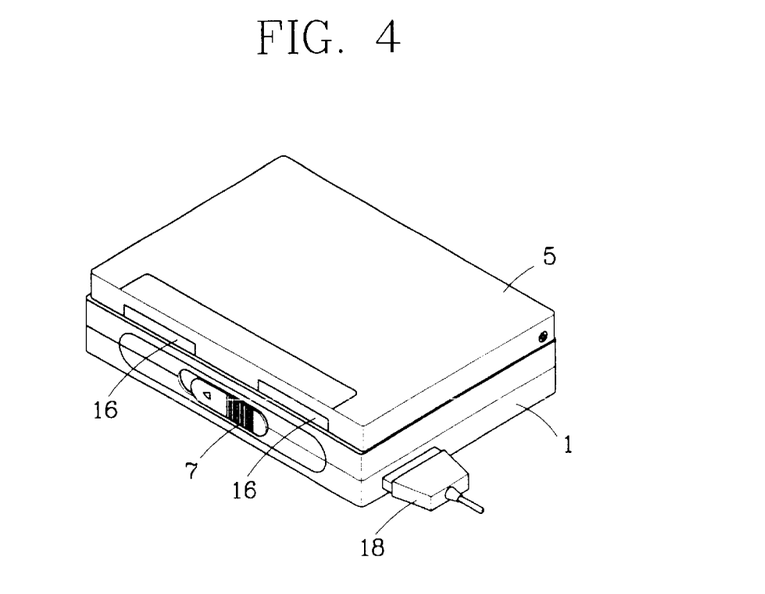
FIG. 4 is a perspective view of the memory card player of FIG. 2, with the door being fully closed.

In order to install a memory card 8 within the player, the open switch 7 is primarily operated in a direction as shown by the arrow 7a of FIG. 4, thus releasing the door 5 from the locking lever 6. The door 5, typically spring-biased, is thus elastically rotated around the hinged junction, thus opening the deck body 1.

After opening the deck body 1 as described above, the memory card 8 is inserted into the seat 9B of a desired holder 9 through an associated opening 15. The door 5 is, thereafter, closed.

Since a card locking member 16 is provided on the deck body 1 at a position corresponding to each insert opening 15, it is possible with a mechanically simple configuration to prevent the memory card 8 from being unexpectedly removed from the player through the insert opening 15. In addition, when the deck body 1 is completely closed by the door 5, the two openings 15 of the door 5 are respectively closed by the two locking members 16.

It is noted that the locking member 16 on the body 1 and the recess 15 on the door 5 are but one arrangement of a configuration between the body 1 and the door 5. Such arrangements will lock a memory card 8 in the memory card player when the door 5 is closed.

After one or more memory cards 8 are installed within the player, the contact port 17 of the player is connected to an appropriate port of a computer, for example, a printer port, using a printer cable 18.

Thereafter, the computer is operated to transfer digital audio data files, downloaded by the computer through the Internet or through a PC communication network and stored in a hard disk, to the player through the cable 18.

In the memory card player, the digital audio data files are stored in the memory cards 8 within the holders 9 of the door 5.

When a user wants to reproduce the digital audio data files, he operates the player. When the player is operated, it reads the digital audio data files from the memory cards 8 prior to reproducing the data files using a decoder. It is thus possible for the user to listen to, for example, music in the form of such digital audio data files using the player at a desired place, e.g., via headphones (not depicted) connected to a port (not depicted) on the player.

Figure 5:
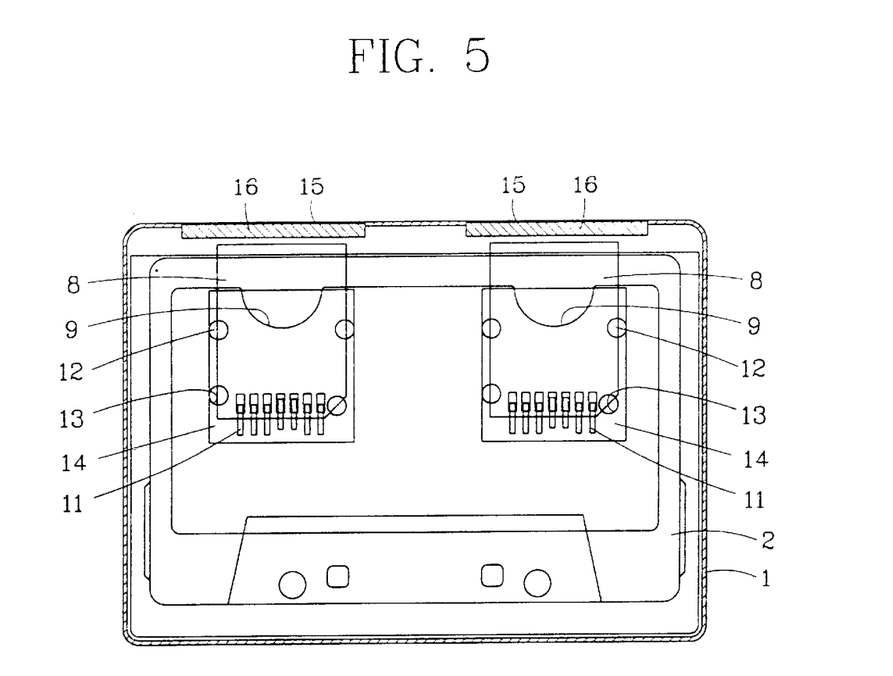
FIG. 5 is a plan-sectioned view of the memory card player of FIG. 2.

In a detailed description, since a plurality of contact terminals 11 are provided on the lower portion of each holder 9 as shown in FIG. 5, each holder 9 effectively transmits the data file from the memory card 8 to the deck body 1 through the flexible cable PCB 10.

When it is necessary to remove the memory cards 8 from the holders 9, the door 5 is opened prior to removing the cards 8 from the holders 9 in a manner reversed to that described for the installation of the cards 8 within the holders 9.

In the second embodiment of this invention, it is preferred (but not necessary) that the memory card player does not have the capability of playing a conventional cassette. That is, it is preferred (but not necessary) that the memory card player of the second embodiment is designed to be exclusively used with a memory card.

The second embodiment is preferred not to include the conventional cassette playing device in order to be thinner. This, is an important advantage of the second embodiment resides in that it provides a memory card player accomplishing the recent trend of thinness.

Figure 8A:
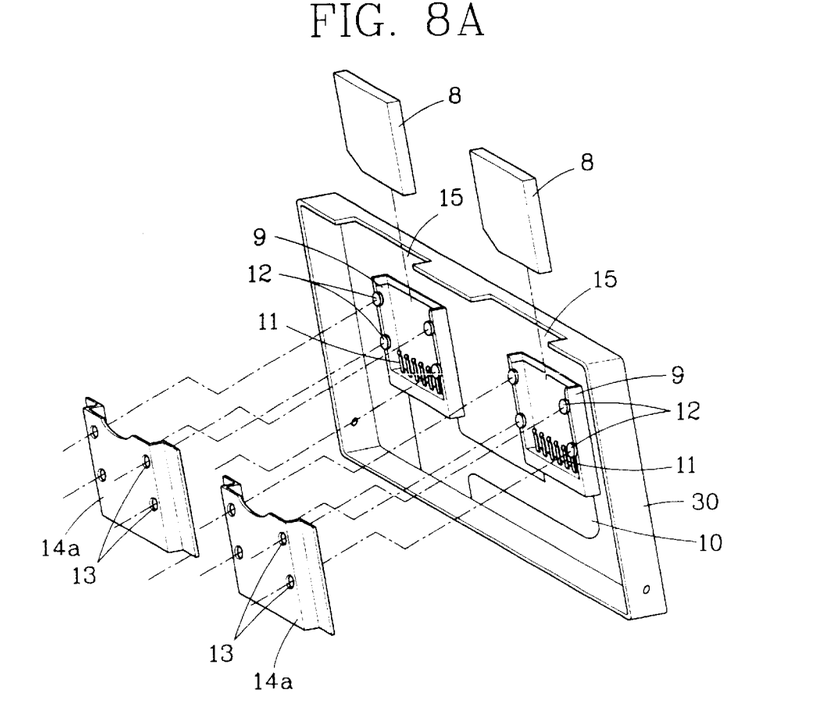
FIG. 8A is an exploded perspective view of the door of a memory card player in accordance with the second embodiment of the present invention, showing two memory cards being removed from their holders interiorly provided on the door.
Figure 8B:
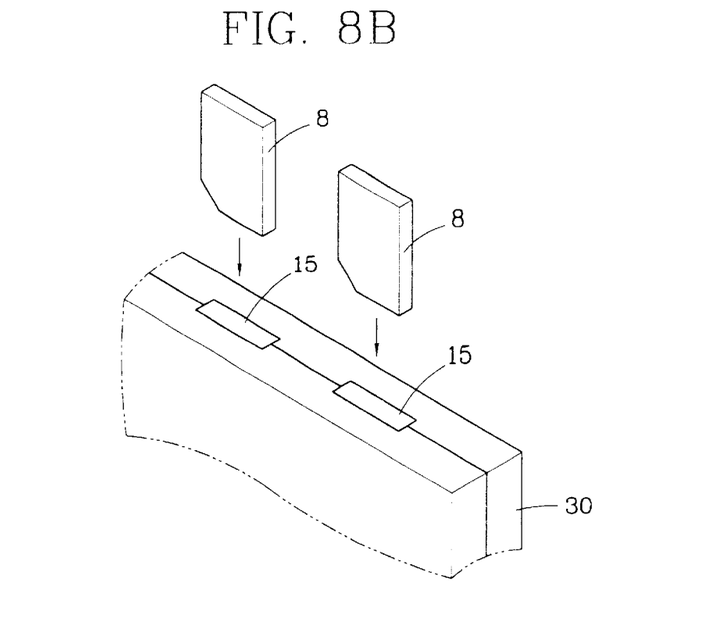
FIG. 8B is a perspective view of the player of the second embodiment, showing an installation of two memory cards in the player.

The construction of the memory card player according to the second embodiment is shown in FIGS. 8A and 8B. As shown in the drawings, two memory card holders 9 are provided on the interior surface of a player door 30 in a way such that the two holders 9 are spaced apart from each other at an interval. In the second embodiment, most of the elements of the player are common with the primary embodiment, but the configuration of the player and the cover for the holders 9 is altered. Those elements common to both the primary embodiment and the second embodiment will thus carry the same reference numerals and further explanation is not deemed necessary.

In the memory card player according to the second embodiment, the holders 9 are not provided with an integrated cover different from the primary embodiment, but are covered with separate covers 14A. The number of the covers 14A is equal to that of the holders 9.

In the second embodiment, a plurality of locking holes 13 are formed on each cover 14A at positions corresponding to the locking pieces 12 of each holder 9. The locking pieces 12 of each holder 9 are tightly fitted into the locking holes 13 of each cover 14A, thus stably assembling each cover 14A with each holder 9 while defining a memory card seat 9B in each holder 9. The above covers 14A also fix the flexible cable PCB 10 on the door 30.

In the memory card player according to the second embodiment, the memory cards are installed in the holders provided on the door with a flexible cable PCB being connected to the contact terminals of the holders. It is thus possible to accomplish the recent trend of thinness of the player. Since the two memory cards are installed in the player at the same time, the player has a large memory capacity.

Due to the memory card holders provided on the door, it is easy to use the player and the appearance of the player is free from being spoiled.

Figure 9A:
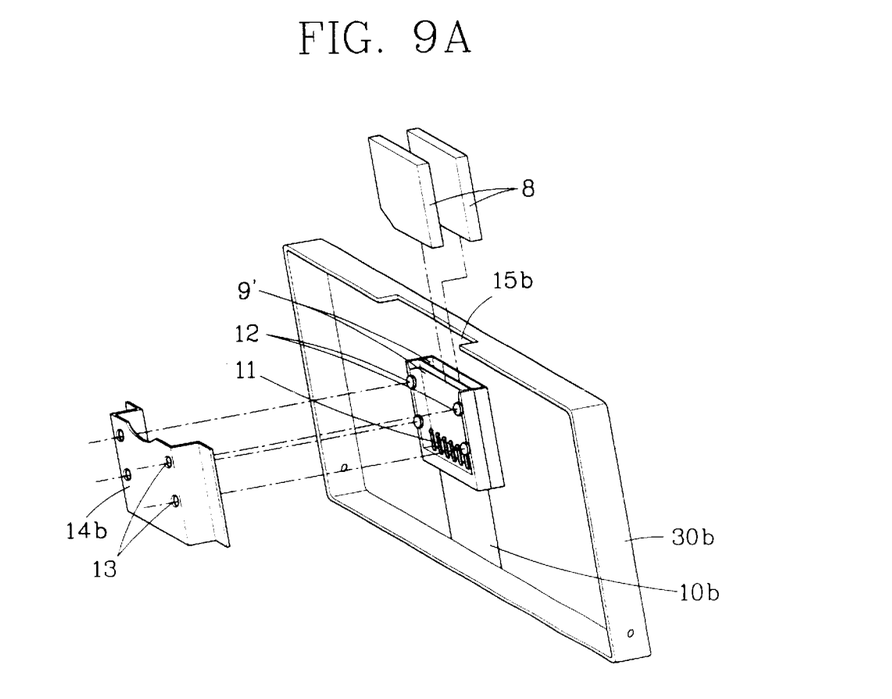
FIG. 9A is an exploded perspective view of the door of a memory card player in accordance with the third embodiment of the present invention, showing two memory cards being removed from their holders interiorly provided on the door.
Figure 9B:
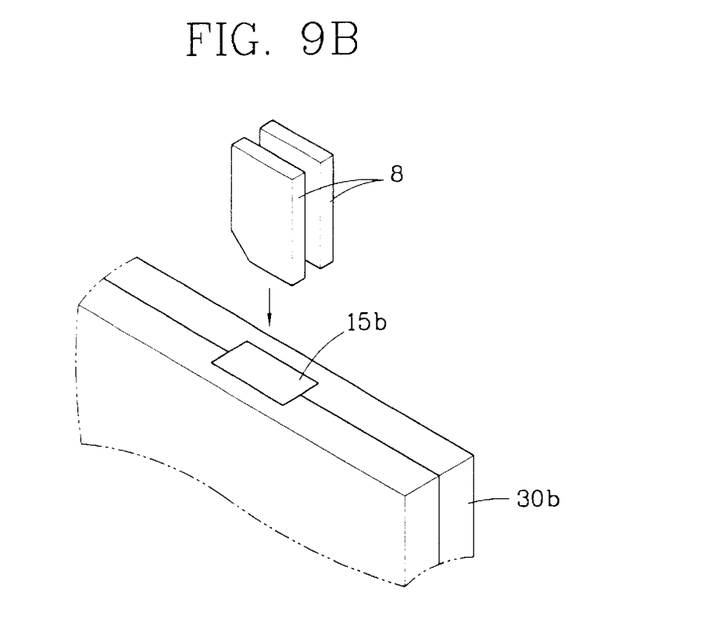
FIG. 9B is a perspective view of the player of the third embodiment, showing an installation of two memory cards in the player.

In the third embodiment of this invention, a memory card holder 9', designed to install two memory cards, is arranged on the interior surface of the door 30B at the center as shown in FIGS. 9A and 9B.

In the drawings, the reference numeral 14B denotes a cover for the holder 9', 10b denotes a flexible cable PCB, and 15B denotes a card insert opening. Those elements common to both the primary embodiment and the third embodiment carry the same reference numerals and further explanation is not deemed necessary.

Like the second embodiment, it is preferred (but not necessary) that the third embodiment not include a conventional cassette playing device in order to be thinner. Similarly, an important advantage of the third embodiment resides in that it is possible to reduce the width of the memory card player.

Figure 10:
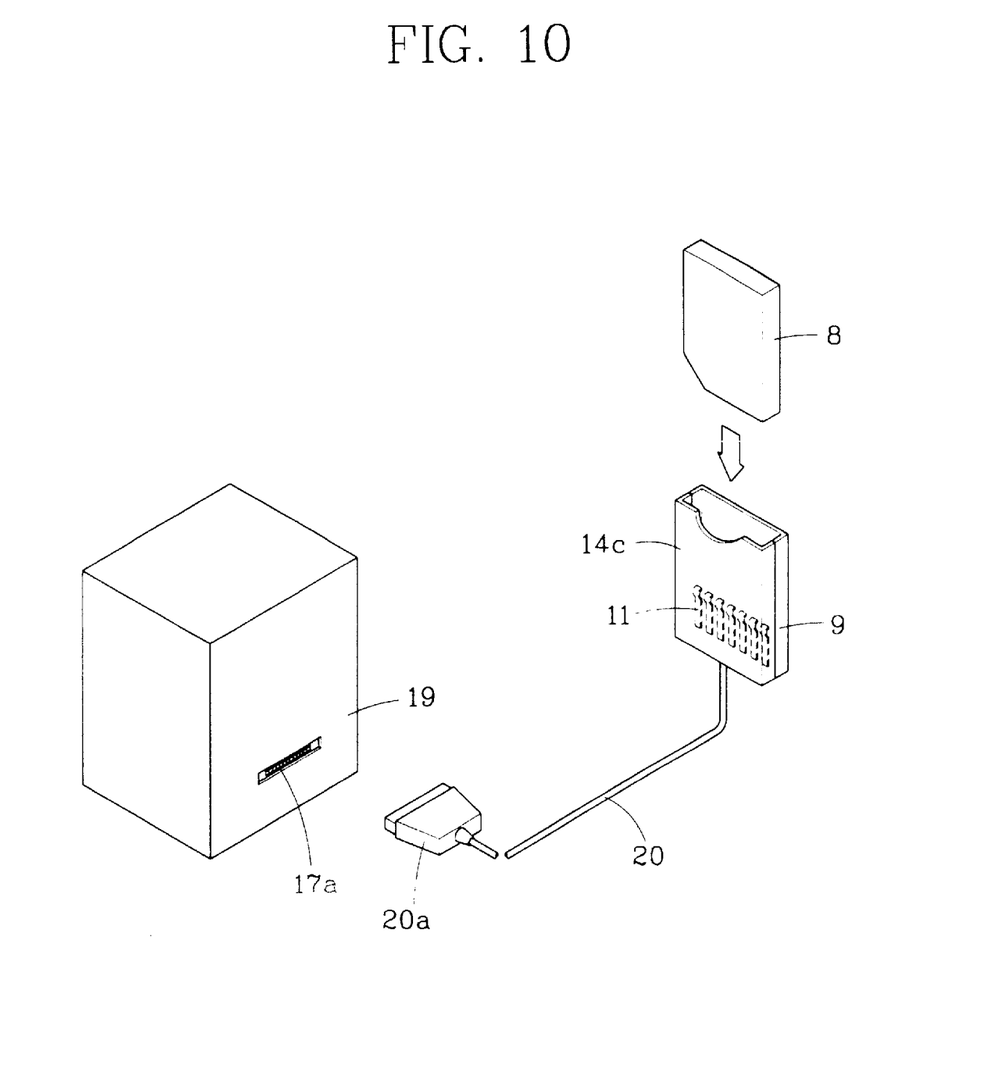
FIG. 10 is a perspective view of a memory card player in accordance with the fourth embodiment of the present invention.

FIG. 10 is a perspective view of a memory card player in accordance with the fourth embodiment of this invention. In this embodiment, the player comprises a player body, or a decoder 19 having a contact port 17A. A memory card 8 is held in a separate holder 9. The holder 9 is assembled with a cover 14C. The memory card holder 9 has a plurality of contact terminals 11 for coming into contact with the memory card 8. In order to connect the contact terminals 11 of the holder 9 to the contact port 17A of the player body 19, a signal transmitting member 20 is used. One end of the member 20 is provided with a jack 20A, and so the member 20 removably engages with the contact port 17A of the body 19 at the jack 20A. The player thus records or reproduces a variety of digital audio data files on or from a memory card 8 as desired.

As described above, the present invention provides a memory card player, of which the memory card playing unit may be set on the door of a conventionally designed cassette player. The memory card playing unit is positioned within a surplus space, provided by the reel section of a cassette, when the cassette is installed within the player. Therefore, the memory card playing unit of this invention is set in the player without increasing the thickness of the player.

In the player of this invention, the memory card playing unit is set on the door of the player, and so the number of elements of the player is preferably reduced. This also reduces the production cost of the player. Since the memory card player is designed to install one or more memory cards at the same time, the player has a large memory capacity. The operational effect and operational reliability of the memory card player is thus remarkably improved.

When it is necessary to repeatedly reproduce a selected section of a digital audio data file, the reproduced sound from the selected section is repeatedly stored in a memory card. It is thus possible for a user to repeatedly listen to the sound by playing the memory card using the player of this invention. This makes the user free from repeatedly operating the elements of the player and effectively prevents frictional abrasion or damage of the elements. The player thus performs its operational function for a lengthy period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A player, comprising:
   a deck body provided with a cassette playing unit for playing a standard cassette tape and a memory card playing unit for playing a memory card; and
   at least one memory card holder provided in said deck body and used for holding a memory card in the deck body, wherein said deck body is configured to simultaneously accommodate both a standard cassette tape and at least one memory card, such that a user can selectively play either the standard cassette tape via said cassette playing unit or the at least one memory card via said memory card playing unit.

2. The player according to claim 1, wherein an openable door is hinged to said deck body, with said memory card holder being positioned adjacent to a standard cassette tape installed in the deck body.

3. The player according to claim 2, wherein said memory card holder is positioned between said door and the standard cassette tape when said door is closed.

4. The player according to claim 3, further comprising:
   a card insert opening formed on said door and used for installing the memory card in the memory card holder; and
   card locking means for preventing the memory card from being unexpectedly removed from the card insert opening after the memory card is completely installed in the holder and said door is closed, said card locking means being provided on said deck body.

5. A player, comprising:
   a deck body provided with a cassette playing unit for playing a standard cassette tape and a memory card playing unit for playing a memory card;
   an openable door hinged to said deck body; and
   at least one memory card holder provided in said door and individually used for holding a memory card in the door, each of said holders having a contact terminal for coming into contact with the memory card, wherein said deck body is configured to simultaneously accommodate both a standard cassette tape and at least one memory card, such that a user can selectively play either the standard cassette tape via said cassette playing unit or the at least one memory card via said memory card playing unit.

6. The player according to claim 5, wherein said memory card holders are either spaced apart from each other at a regular interval or overlapped.

7. The player according to claim 5, further comprising:
   a card insert opening formed on said door and used for installing a memory card in an associated memory card holder; and
   card locking means for preventing the memory card from being unexpectedly removed from the insert opening after the memory card is completely installed in the holder and said door is closed, said card locking means being provided on said deck body.

8. A player, comprising:
   a player body provided with a cassette playing unit for playing a standard cassette tape and a memory card playing unit for playing a memory card;
   at least one memory card holder provided in said player body and individually used for holding a memory card in the player body, each of said at least one holder having a contact terminal for coming into contact with the memory card; and
   a card insert opening formed on said player body at a position corresponding to each of the holders and used for installing a memory card in the holder, wherein said player body is configured to simultaneously accommodate both a standard cassette tape and at least one memory card, such that a user can selectively play either the standard cassette tape via said cassette playing unit or the at least one memory card via said memory card playing unit.

9. The player according to claim 8, wherein said memory card holder includes at least two memory card holders spaced apart from each other at a regular interval.

10. The player according to claim 8, wherein said memory card holders are overlapped.

11. A player, comprising:
    a player body having a contact port, and being provided with a cassette playing unit for playing a standard cassette tape and a memory card playing unit for playing a memory card;
    at least one memory card holder used for holding a memory card, said holder having a contact terminal for coming into contact with a memory card; and a signal transmitting member connecting said memory card holder to said contact port of the player body, wherein said player body is configured to simultaneously accommodate both a standard cassette tape and at least one memory card, such that a user can selectively play either the standard cassette tape via said cassette playing unit or the at least one memory card via said memory card playing unit.

12. A player comprising:

a deck body provided with a cassette playing unit for playing a standard cassette tape and a memory card playing unit for playing a memory card; and a door provided with at least one memory card holder having contact terminals for a memory card;

wherein said deck body and said door are complimentary configured to lock at least one memory card into said at least one memory card holder, respectively, when said door is closed, wherein said deck body is configured to simultaneously accommodate both a standard cassette tape and at least one memory card, such that a user can selectively play either the standard cassette tape via said cassette playing unit or the at least one memory card via said memory card playing unit.

* * * * *